INVENTOR.
William P. Malarkey
Carl A. Ricard and
William J. Lally.
BY
ATTORNEY

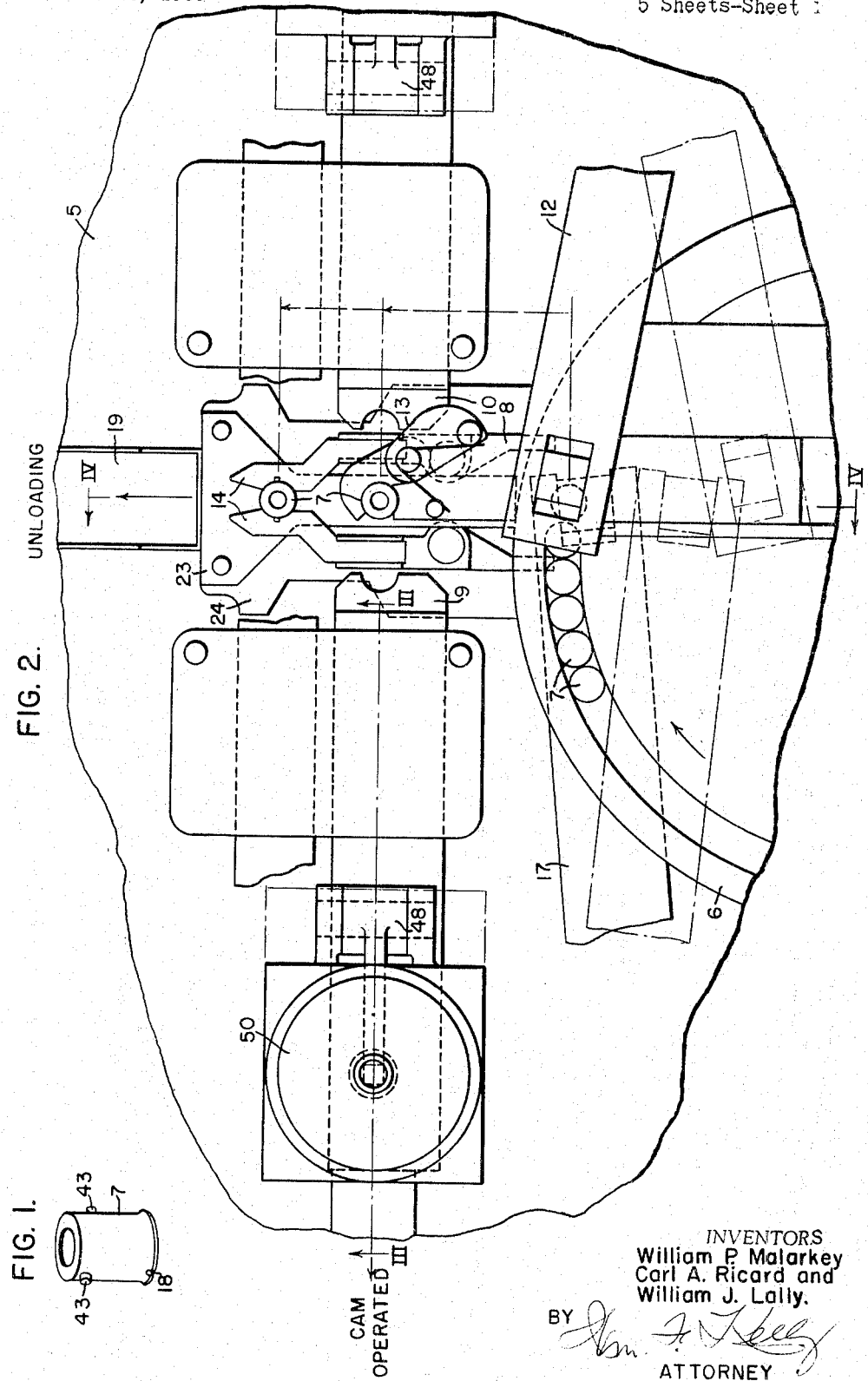

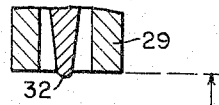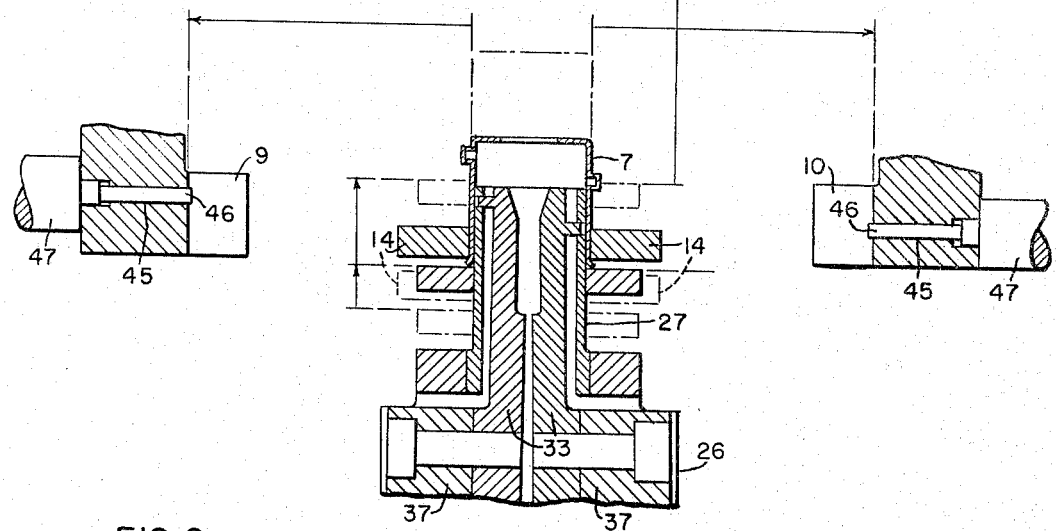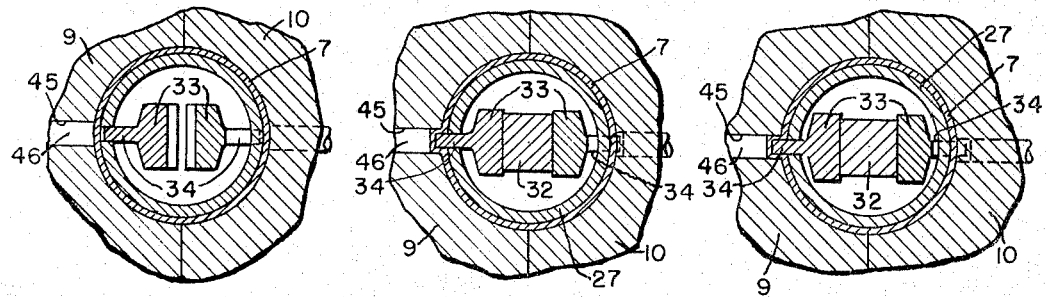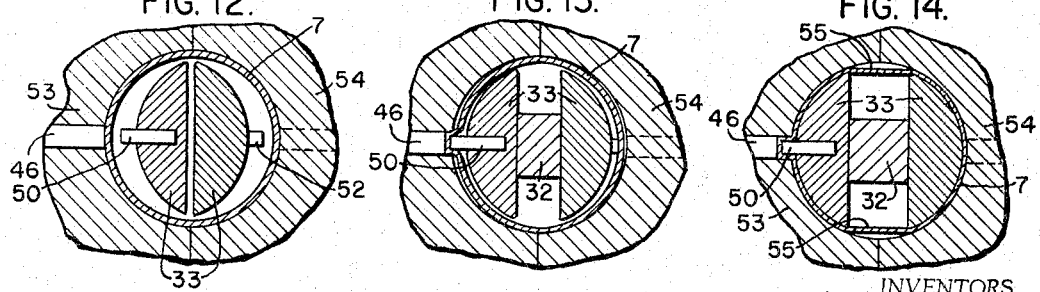

United States Patent Office 3,355,928
Patented Dec. 5, 1967

3,355,928
APPARATUS FOR FORMING SIDE PINS ON BASE SHELLS
William P. Malarkey, Nutley, and Carl A. Ricard, Fair Lawn, N.J., and William J. Lally, New York, N.Y., assignors to Westinghouse Electric Corporation, Pittsburgh, Pa., a corporation of Pennsylvania
Filed Feb. 26, 1965, Ser. No. 435,561
7 Claims. (Cl. 72—355)

ABSTRACT OF THE DISCLOSURE

An apparatus for die forming side pins from the walls of base shells for incandescent and photoflash lamps. The shell is telescopically received on a hollow sleeve within which a pair of spreadable male die members, having forming pins thereon, are coaxially disposed. Female dies close about the base shell and are provided with openings having pressure-loaded reciprocally movable pins therein. Movement of a wedge form between the spreadable male die members causes the forming pins thereon to move through openings in the sleeve to force the shell wall to deform and flow into the female die openings in opposition to the counter-pressure provided by the pressure loaded pins.

The present invention relates to apparatus for die forming the side pins on the base shells for incandescent and photoflash lamps, wherein such pins are very accurately formed with sharp corners by a single die forming operation to enable lamps provided with such bases to be readily inserted and dependably held in a socket.

Machines for the forming of side pins on the base shells for lamps are known to the art with one such machine being disclosed and claimed in Patent No. 2,912,949 granted Nov. 17, 1959 to Richard A. Rehberg and William J. Williams, and assigned to the same assignee as the present invention. However, the difficulty with such prior machines has resided in the fact that their production rate is low because such pin forming has heretofore actually constituted die stamping of the shell wall, requiring several separate and distinct operations progressively performed at a similar number of work stations of the machine. This results in increased manufacturing costs of the base shell, which is reflected in the consumer sale price of a completed lamp.

It is accordingly the primary object of the present invention to provide an apparatus which operates to actually die form the side pins from the wall of the base shell in a single operation requiring only one work station of the machine for each shell.

Another object of the present invention is the provision of apparatus operable to cause the die forming of side pins from the wall of a base shell for lamps wherein the wall thickness of such pins is maintained substantially uniform and provided with sharp corners to enable lamps with such bases to be readily inserted in sockets.

A further object of the present invention is the provisions of an apparatus for the die forming of side pins from the wall of a base shell which accurately positions the location of such shells in the apparatus for the forming of the pins and facilitates the removal of the completed base therefrom thereby eliminating shrinkage due to product deformation.

The foregoing objects of the present invention, together with other objects which will become apparent from the following description, are achieved by providing a machine for the die forming of side pins from the wall of a base shell wherein the latter is accurately disposed in a definite location on the machine and rigidly retained on a sleeve forming a part of such machine. When so positioned and retained, a pair of female dies close about the base shell which are provided with holes therein corresponding to the outside diameter of the desired finished side pins. A pressure-loaded pin is coaxially disposed in each of these die-holes which bear against the outer diameter of the base shell when in its position upon the locating sleeve. Thereafter, a pair of forming pins carried by spreadable jaws and coaxially disposed relative to the holes in the surrounding female dies are moved outwardly through openings in the retaining sleeve into contact with the inner surface of the shell wall. The greater pressure of such forming pins against the counter-pressure exerted by the pressure-loaded pins in the holes of the surrounding female dies thereupon causes a drawing of the shell wall to form side pins having sharp corners and of substantially uniform wall thickness.

The present invention can be readily understood by reference to the accompanying drawing wherein:

FIGURE 1 is a perspective view of a complete base shell for a lamp which is provided with drawn side pins in accordance with the present invention;

FIGURE 2 is a fragmentary top plan view showing the apparatus of the present invention together with a portion of the base shell feeding and discharge conveyors adjacent to such apparatus;

FIGURE 8 is a fragmentary cross-sectional view somewhat similar to FIG. 7 but showing withdrawal of the forming dies together with partial stripping of the base shell with its completely formed side pins from the supporting sleeve;

FIGURE 9 is a cross-sectional view taken on the line IX—IX of FIG. 6 but with the additional showing of the outer female dies in their closed surrounding position;

FIGURE 10 is a cross-sectional view similar to FIG. 9 but showing the spreadable forming dies in their partially open position;

FIGURE 11 is a cross-sectional view similar to FIGS. 9 and 10 except that the spreadable forming dies are in their fully opened position with the side pins completely formed; and FIGURES 12, 13 and 14 are cross-sectional views similar to FIGS. 9, 10 and 11, respectively, in showing the same operative positions of the spreadable forming dies but of a modification which the present invention may take.

Figure 4:
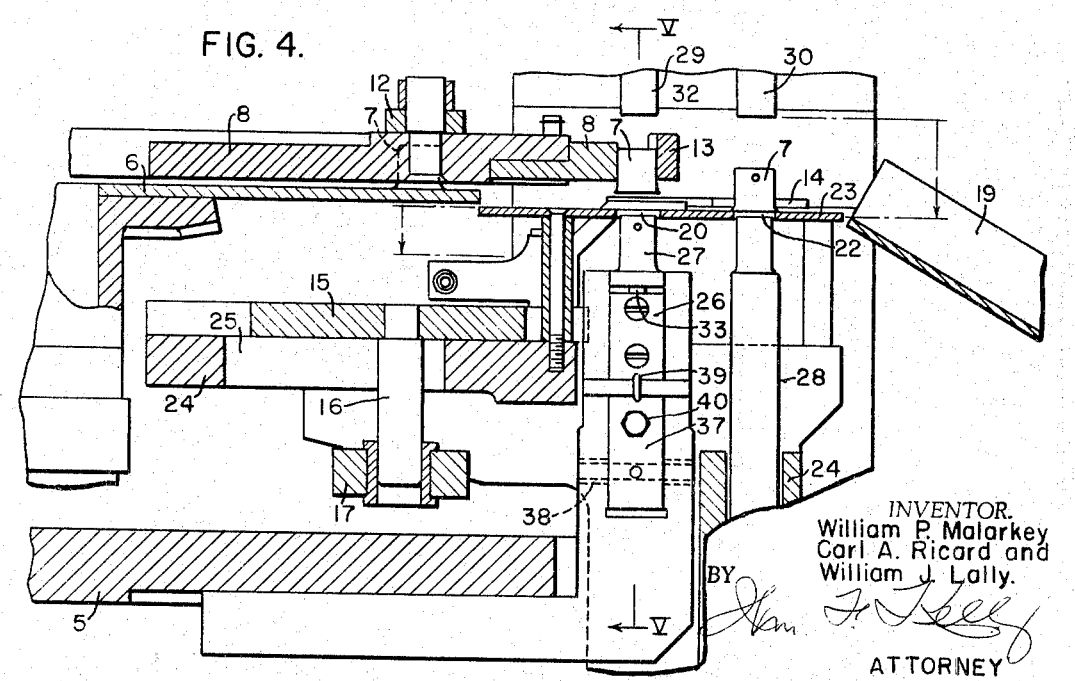
FIGURE 4 is a cross-sectional view taken on the line IV—IV of FIG. 2 and showing the base shell supporting sleeve preparatory to receiving a base shell, as well as showing a base shell with its completed side pins in its position preparatory to being placed upon a second support for edge notching.

Referring now more specifically to the drawings, the machine for die forming the side pins on a base shell, as shown more particularly in FIG. 2, comprises a base 5 provided with a rotatable conveyor 6 which intermittently feeds base shells 7 to loading position of a transfer slide 8. This slide 8 is reciprocally movable between a pair of outer surrounding female dies 9 and 10 by a rocker arm 12 which in turn is operated by a cam (not shown) and such slide 8 carries a spring-biased finger 13 that opens in the retracted position of the transfer slide 8 to select a base shell 7 from the rotatable conveyor 6 and transfer it away from the latter into an accurate position above a shell supporting sleeve, as hereinafter described more in detail. Upon completion of the slide pin forming at this latter position, a pair of reciprocally movable spring-biased jaws 14 grip the base shell and moves it further away from the conveyor 6 into a base shell notching position, as seen in FIGS. 2 and 4. The jaws 14 are pivotally connected to a horizontal slide 15 having a pin 16 slidably engaging one end of a second rocker arm 17, with the latter being operable by a cam (not shown). Following the making of a notch 18 (FIG. 1) in the lower periphery of the base shell 7 for connection of a lamp lead-in wire thereto, such shell 7 is transferred to an unloading or discharge chute 19 (FIGS. 2 and 4) by an air-blast or the like.

By reference now more particularly to FIG. 4 it will be noted that when the base shells 7 are moved, by the finger 13 and jaws 14 affixed to the respective reciprocating slides 8 and 15, into their work performing stations they will first come accurately to rest immediately above a pair of openings 20 and 22 provided in a relatively wide stripper plate 23 which is supported by a platform 24. This latter platform 24 is provided with a slot 25, so that the pin 16 is freely movable therein without interference from such platform, and since the latter platform 24 is movable up and down by a suitable cam (not shown) this causes a raising and lowering of the stripper plate 23 for a height as shown by the small arrow in FIG. 4. Immediately below the opening 20 and coaxially aligned therewith is a hollow supporting stud 26 having an upper sleeve portion 27 and a second supporting stud 28 is similarly disposed coaxially beneath the stripper plate opening 22.

A pair of cam operated reciprocatory plungers 29 and 30 are disposed above the stripper plate openings 20 and 22 and hence coaxially align with the base shells 7 and the respective supporting studs 26 and 28. These plungers 29 and 30 descend substantially simultaneously with the downward movement of the stripper plate 23 and clamping jaws 14 so that by the time such plungers 29 and 30 contact the base shells 7 at the respective work stations, the stripper plate 23 and the jaws 14 will have moved downwardly beyond the upper ends of the supporting studs 26 and 28. The pressure thus exerted by the plunger 29 first forces the adjacent base shell 7 downwardly through the finger 13 until such shell 7 begins to engage the upper end of the hollow sleeve 27 on the supporting stud 26, at which time the finger 13 releases allowing the plunger 29 to complete the telescopic engagement of the base shell 7 with the hollow sleeve 27. During downward movement of the stripper plate 23 and the jaws 14, the latter act to position the base shell 7 which is held thereby in telescopic engagement with the upper end of the supporting stud 28, after which the plunger 30 in its downward position holds such shell on the stud end. When the base shells 7 have completed their telescopic engagement with the respective supporting studs 26 and 28, the downward movement of the plungers 29 and 30 is arrested. Thereupon the jaws 14 are disengaged from the base shell 7, as deposited on the supporting stud 28, by withdrawal of the slide 15 under operation of the rocker arm 17, with such clamping jaws thereafter moving into engagement with the base shell 7 deposited on the hollow sleeve 27 of supporting stud 26.

Figure 5:
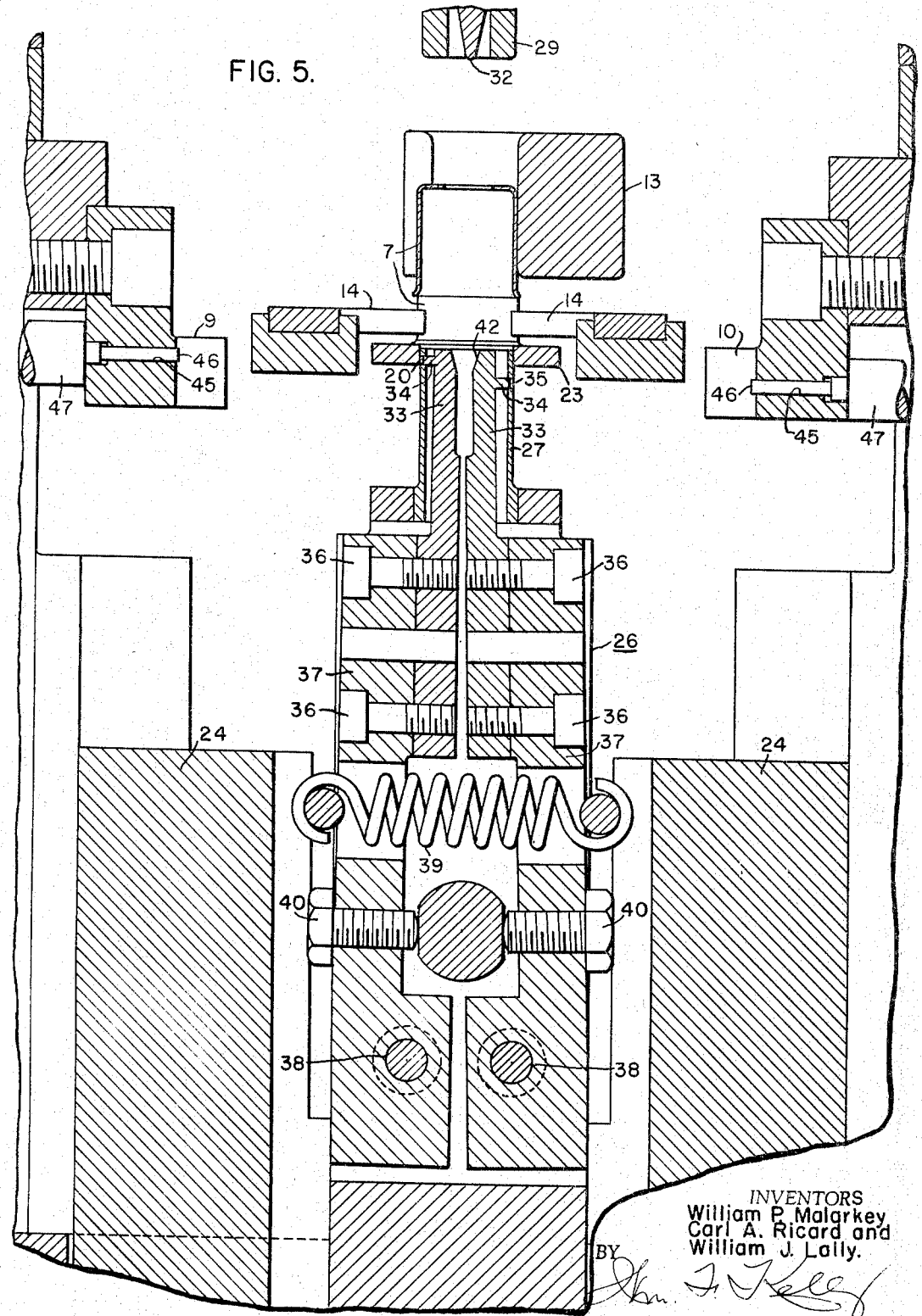
FIGURE 5 is an enlarged vertical cross-sectional view taken on the line V—V of FIG. 4 and showing a base shell preparatory to its being positioned on the base shell supporting sleeve.
Figure 6:
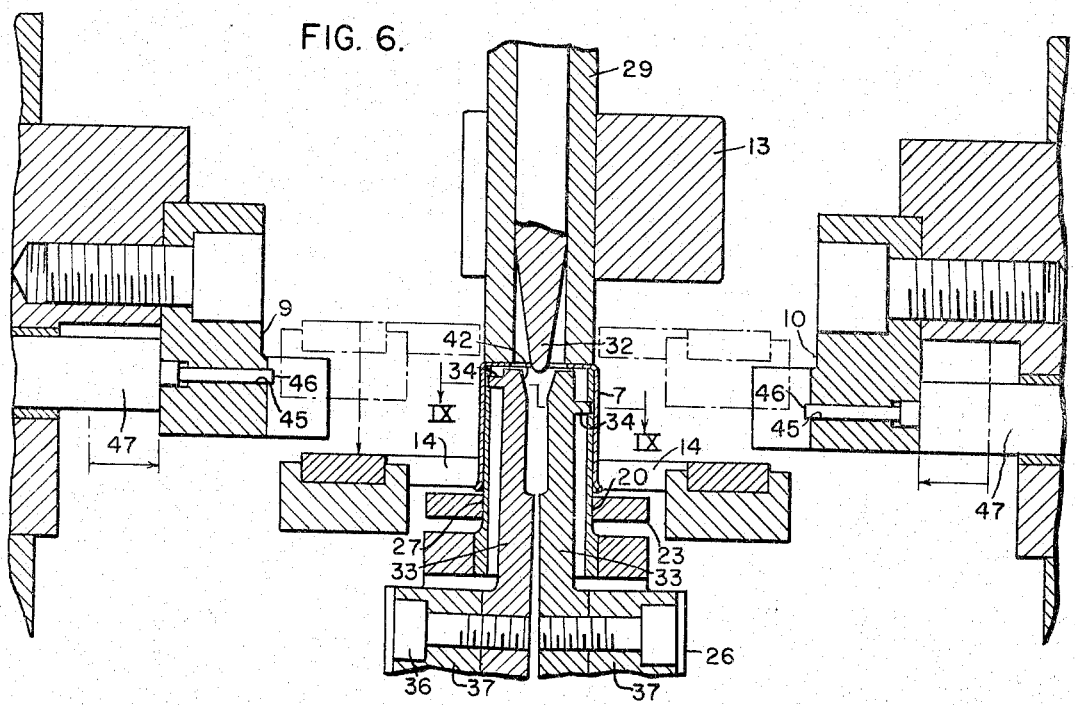
FIGURE 6 is a cross-sectional view similar to FIG. 5 and showing the base shell in place on its supporting sleeve together with the wedge in position preparatory to movement of the spreadable forming jaws by insertion of the operating wedge therebetween.
Figure 7:
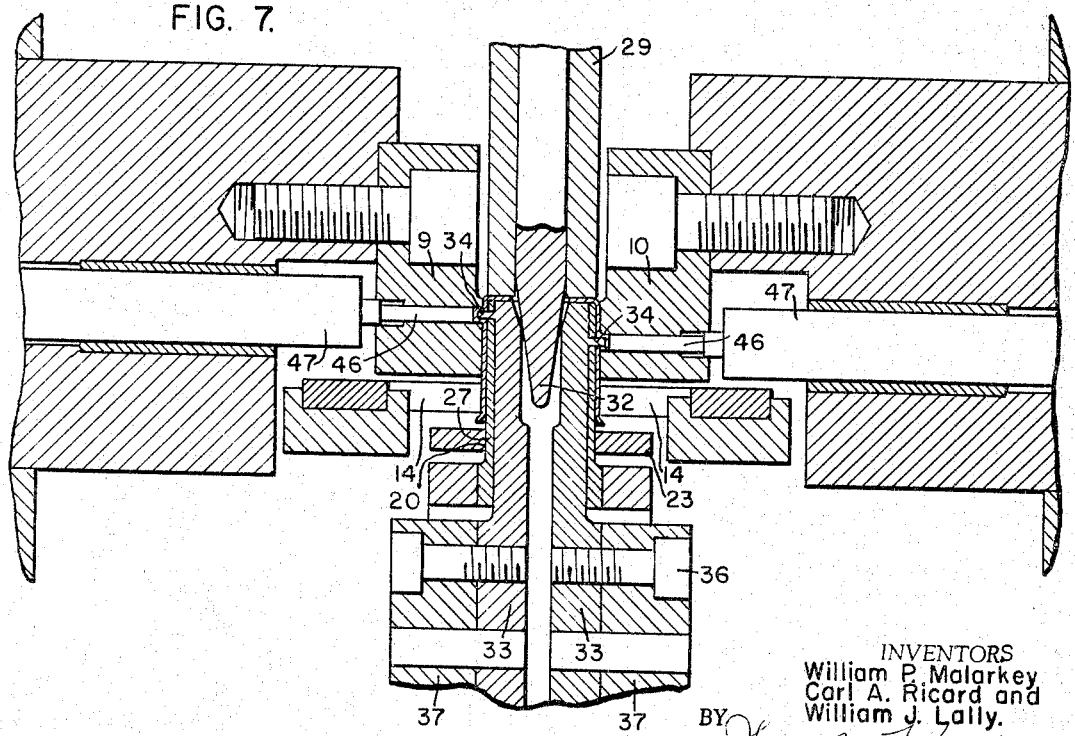
FIGURE 7 is a view similar to FIG. 6 except that it shows the forming dies in their final operating position with formation of the extruded side pins.

By reference now more particularly to FIGS. 5, 6 and 7 it will be noted that the plunger 29 is hollow and provided with a reciprocating wedge 32 which continues to move downwardly and hence outwardly from the plunger 29 even after the latter has ceased its descent and the base shell 7 is in complete telescopic engagement with the hollow sleeve 27. As shown in these FIGS. 5, 6, 7 and 8, the supporting stud 26 is likewise hollow along with the sleeve 27 and interiorly thereof a pair of spring-loaded hardened forming jaws 33 are provided each of which carries a laterally extending projection 34 protruding through holes 35 in the hollow sleeve 27, with such jaws and pins actually constituting the male extrusion die member. These hardened extruding jaws 33 are secured by bolts or the like 36 to suitable supports 37 which are limited rotatable about pivot pins 38 and biased toward each other by a suitable coil spring 39.

Adjustment screws 40 are provided for the forming jaws 33 and are normally set so as to position the outer perpendicular surface of the projections or male dies 34 substantially flush with the outer surface of the hollow sleeve 27, as seen in FIGS. 5, 6, 8 and 9. Accordingly, when the wedge 32 moves downwardly from inside the hollow plunger 29, after the latter has come to rest in its lowermost position, such wedge 32 passes through an opening in the base shell 7 and enters the tapered bore 42 between the extruding jaws 33, as shown in FIG. 6, and which jaws are then spaced apart as seen in FIG. 9. The continued downward movement of such wedge 32 then causes rotation of the extruding jaws 33 about their pivot pins 38 with attendant spreading therebetween. This forces the projections or male dies 34 outwardly through the holes 35 and beyond the outer surface of the hollow sleeve 27 against the interior wall of the base shell 7 then positioned on such sleeve to initiate the die forming of side pins 43, as shown in FIGS. 7 and 10. It is also to be noted from these latter figures that at this time the pair of previously mentioned female dies 9 and 10 will have moved from their open position seen in FIGS. 5 and 6 to their closed position surrounding the supported base shell 7, as shown particularly in FIG. 7. These female dies 9 and 10 are provided with a horizontal bore 45 having a diameter corresponding to the outer diameter desired for the side pins 43 and a pressure-loaded pin 46 is disposed in each such bore 45.

Figure 3:
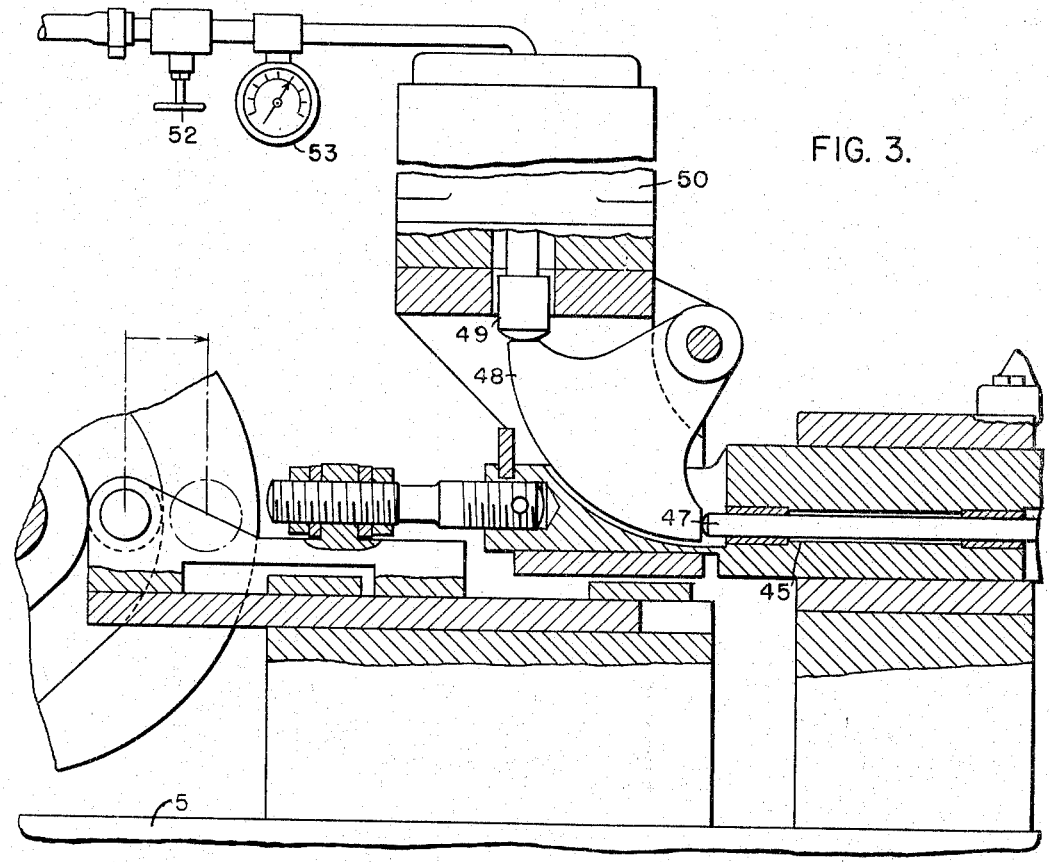
FIGURE 3 is a cross-sectional view taken on the line III—III of FIG. 2 and showing a portion of the apparatus for developing and applying pressure to the pressure loaded pins of the outer surrounding female dies.

In the closed surrounded position of the female dies 9 and 10, the pressure-loaded pins 46 are coaxially aligned with the projection constituting the male forming die 34 (FIGS. 7, 8, 9, 10 and 11) so that upon spreading of the latter by the wedge 32, as previously herein mentioned, the wall of the base shell 7 is forced outwardly into the bore 45 in each die-half, as the pressure exerted on the projection die 34 by the wedge 32 exceeds the counter-pressure applied to the pressure-loaded pins 46. Such counter-pressure is applied to the pins 46 by coaxially aligned plungers 47 which in turn are supplied with a preselectable pressure as desired. Referring now to FIG. 3 it will be noted that the outer end of each plunger 47 is engaged by one end of a quadrant 48 while its other normal end is contacted by the outer end of a fluid-operated piston 49 protruding from a cylinder 50. The counter-pressure applied to the pins 46 is selected by operation of a valve 52 in the fluid supply conduit for the cylinder 50 which is recorded by a gauge 53. Such pressure is normally set so as to load the pins 46 with a counter-pressure just slightly below that exerted by the male forming pins 34 under action of the wedge 32.

Upon movement of the outer surrounding female dies 9 and 10 into closed position, the pressure-loaded pins 46 thus coaxially align with the male forming dies 34 and a pressure is thus applied to both sides of the base shell wall when the wedge 32 has completed its downward movement. Since the pressure of the male forming dies 34 exerted by the wedge 32 is slightly greater than the preselected counter-pressure on the pressure-loaded pins 46, this accordingly causes the section of the shell wall engaged by the male dies 34 to be drawn or to flow outwardly into the bores 45 in the female dies 9 and 10 as the pressure loaded pins 46 gradually recede due to the pressure differential. When these male forming dies 34 have completed their outward movement upon downward travel of the wedge 32 being arrested, the side pins 43 thus formed will have a uniform wall thickness and be provided with sharp edges at their juncture with the base shell wall and at the outer peripheral perpendicular end thereof, as clearly shown in FIGS. 1, 8 and 11. Thereupon the wedge 32 retracts into the hollow plunger 29 with the latter, together with plunger 30, moving upwardly and the outer surrounding female dies 9 and 10 separating and returning to their outermost position, as shown in FIG. 8. At approximately the same time the stripper plate 23 and clamping jaws move upwardly relative to the supporting studs 26 and 28 thus removing the base shells 7 from their telescopic engagement with the latter, preparatory to a repetition of operation of the apparatus.

Summarizing the sequence of operations, each base shell is moved from the conveyor 6 and onto the supporting stud 26 at which position the side pin forming operation is performed. Thereafter, each base shell is moved onto the supporting stud 28 where the base notching operation is performed. After this last operation, the processed base shell is moved into the unloading chute. After each base shell is moved from position on the respective supporting studs 26 and 28, a new base is moved into position on the respective studs for a repetition of the operation.

From the foregoing it should thus be apparent that the sharp cornered formation of the side pins 43 with their uniform wall thickness is thus strictly due to the drawing thereof, as distinguished from a single or progressive stamping operation such as shown in the aforesaid Patent No. 2,912,949, which too frequently produces an imperfect product due to tearing of the formed pin at areas of decreased wall thickness and in every instance failing to produce sharp corners. A further ensuing advantage of the present invention resides in the provision of the hollow sleeve 27 which is telescopically engaged by the base shell 7 and through which the male forming dies 34 move. This can be better appreciated by reference now particularly to FIGS. 12, 13 and 14 wherein a pair of male forming dies 50 and 52 and outer surrounding female dies 53 and 54 are shown with a base shell 7 disposed therebetween. The dies in this modification are analogous to those previously described so far as their operation is concerned and in FIG. 12 are shown in position prior to any spreading of the male forming dies 50 and 52.

On the other hand, FIG. 13 illustrates the initial forming of the side wall of the base shell 7 due to spreading of the male forming dies 50 and 52 by the wedge 32 and under the counter-pressure exerted upon the pins 46 whereas FIG. 14 shows the completely formed side pins resulting in the absence of the hollow sleeve 27. From this latter FIG. 14 it will be noted that the wall of the base shell 7 has been distorted out-of-round with diametrically disposed flat areas on the circumference of the shell at about 90° to the side pins 46. These flat areas are entirely undesirable on a finished lamp base because of ensuing looseness when such lamp is inserted in the usual socket. Also, in the modification of FIGS. 12, 13 and 14 the inner male forming dies 50 and 52 require a larger cross-section so as to form a sufficiently strong support for the hardened pin portions. The outer surface of such dies 50 and 52 must, also, be rather accurately machined to produce a radius of curvature as close to that of the base shell as possible, since making this any smaller would only result in the undesirable flattened area 55 being greatly increased. Furthermore the spacing thus resulting between these accurately machined dies 50 and 52 is thus rendered so small as to necessitate a knife edge on the wedge 32 increasing its cost and hazards of breaking. By utilizing the hollow sleeve 27 as hereinbefore described, the circumferential contour of the base shell 7 remains entirely undistorted during forming of the side pins 43 and allows use of male forming dies 34 of one piece and much smaller cross-section with indiscriminate contour. Moreover, such sleeve 27 facilitates mounting and removal of the base shell 7 on the supporting stud 26 which assures their proper longitudinal alignment and attendant extrusion of the side pins 43 consistently normal to the base shell axis.

It should thus be apparent to those skilled in the art that an apparatus has been herein shown and described which is operable to rapidly and consistently form side pins from the wall of a base shell for incandescent lamps and the like wherein such side pins are accurately formed and protrude outwardly from the base shell wall normal to the longitudinal axis of the shell. Moreover, these side pins are provided with a uniform wall thickness and formed with sharp corners at their juncture with the shell wall as well as at the end of the pins thus assuring positive engagement with a lamp socket and substantially eliminating production of a salvaged base due to tearing of the side pin wall or distortion of the base shell in any manner.

Although two embodiments of the present invention have been herein shown and described, it is to be understood that still further modifications thereof may be made without departing from the spirit and scope of the invention.

We claim as our invention:

1. An apparatus for forming the side pins on a lamp base shell, said apparatus comprising:
    (a) a supporting stud for telescopically holding a base shell thereon;
    (b) a pair of male forming dies carried by said supporting stud and having a pair of laterally extending projections for engaging the inner surface of said base shell;
    (c) a pair of outer female dies movable to surround said base shell and having openings therein coaxially disposed relative to said male forming dies projections, and said female dies being provided with pressure-loaded pins reciprocally movable in said openings and subjected to a preselected pressure in the direction of said base shell; and
    (d) means operable to apply pressure to said male forming dies to cause outward lateral drawing of a portion of the wall of said shell into the openings of said female die against the counter-pressure of said pressure-loaded pins to form side pins on the outer surface of said base shell having a uniform wall thickness and sharp corners.

2. An apparatus for forming the side pins on a lamp base shell, said apparatus comprising:
    (a) a supporting stud provided with a hollow sleeve for telescopically holding a base shell in accurate coaxial alignment thereon;
    (b) a pair of male forming dies carried by said supporting stud and having a pair of laterally extending projections for engaging the inner surface of said base shell;
    (c) a pair of outer female dies movable to surround said base shell and having openings therein coaxially disposed relative to said male forming die projections, and said female dies being provided with pressure-loaded pins reciprocally movable in said openings and subjected to a preselected pressure in the direction of said base shell; and
    (d) means operable to apply pressure to said male forming dies to cause outward lateral drawing of a portion of the wall of said shell into the openings of said female die against the counter-pressure of said pressure-loaded pins to form side pins on the outer surface of said base shell having a uniform wall thickness and sharp corners.

3. An apparatus for forming the side pins on a lamp base shell, said apparatus comprising:

(a) a supporting stud provided with a hollow sleeve for telescopically holding a base shell in accurate coaxial alignment thereon;

(b) a pair of male forming dies disposed interiorly of said hollow sleeve and having laterally extending projections passing through openings in said hollow sleeve into engagement with the inner surface of said base shell;

(c) a pair of outer female dies movable to surround said base shell and having openings therein coaxially disposed relative to said male forming die projections and the openings in said hollow sleeve, and said female dies being provided with pressure-loaded pins reciprocally movable in said openings and subjected to a preselected pressure in the direction of said base shell; and (d) means operable to apply pressure to said male forming dies to cause outward lateral drawing of a portion of the wall of said shell into the openings of said female die against the counter-pressure of said pressure-loaded pins to form side pins on the outer surface of said base shell having a uniform wall thickness and sharp corners.

4. An apparatus for forming the side pins on a lamp base shell, said apparatus comprising:

(a) a supporting stud provided with a hollow sleeve for telescopically holding a base shell in accurate coaxial alignment thereon;

(b) a pair of separable male forming dies disposed interiorly of said hollow sleeve and having laterally extending projections passing through openings in said hollow sleeve into engagement with the inner surface of said base shell;

(c) a pair of outer female dies movable to surround said base shell and having openings therein coaxially disposed relative to said male forming die projections and the openings in said hollow sleeve, and said female dies being provided with pressure-loaded pins reciprocally movable in said openings and subjected to a preselected pressure in the direction of said base shell; and (d) a member movable between said separable male forming dies to apply pressure thereto and cause outward lateral drawing of a portion of the wall of said shell into the openings of said female die against the counter-pressure of said pressure-loaded pins to form side pins on the outer surface of said base shell having a uniform wall thickness and sharp corners.

5. An apparatus for forming the side pins on a lamp base shell, said apparatus comprising:

(a) a supporting stud provided with a hollow sleeve for telescopically holding a base shell in accurate coaxial alignment thereon;

(b) a pair of separable male forming dies disposed interiorly of said hollow sleeve and having laterally extending projections passing through openings in said hollow sleeve into engagement with the inner surface of said base shell;

(c) a pair of outer female dies movable to surround said base shell and having openings therein coaxially disposed relative to said male forming dies projections and the openings in said hollow sleeve, and said female dies being provided with pressure-loaded pins reciprocally movable in said openings and subjected to a preselected pressure in the direction of said base shell;

(d) a source of fluid pressure carried by said apparatus and controllable by an operator for applying a preselected pressure to the reciprocally movable pins in the openings of said female dies; and (e) means operable into engagement with said male forming dies to apply pressure thereto and cause outward lateral drawing of a portion of the wall of said shell into the openings of said female die against the counter-pressure of said pressure-loaded pins to form side pins on the outer surface of said base shell having a uniform wall thickness and sharp corners.

6. An apparatus for forming the side pins on a lamp base shell said apparatus comprising:

(a) a base provided with a pair of supporting studs one of which has a hollow sleeve and with said studs being operable to telescopically hold a base shell in accurate coaxial alignment thereon;

(b) a reciprocally operable slide on said base having a finger for grasping a base shell at one end of the travel of said slide and depositing said shell coaxially on the hollow sleeve of one of said supporting studs at the other end of its travel;

(c) a second reciprocally operable slide on said base having a pair of jaws for transporting a base shell after formation of its side pins on said hollow sleeve to the other of said supporting studs;

(d) a pair of male forming dies disposed interiorly of said hollow sleeve and having laterally extending projections passing through openings in said hollow sleeve into engagement with the inner surface of said base shell;

(e) a pair of outer female dies movable to surround said base shell and having openings therein coaxially disposed relative to said male forming die projections and the openings in said hollow sleeve, and said female dies being provided with pressure-loaded pins reciprocally movable in said openings and subjected to a preselected pressure in the direction of said base shell; and (f) means operable to apply pressure to said male forming dies to cause outward lateral extrusion of a portion of the wall of said shell into the openings of said female die against the counter-pressure of said pressure-loaded pins to form side pins on the outer surface of said base shell having a uniform wall thickness and sharp corners.

7. An apparatus for forming the side pins on a lamp base shell, said apparatus comprising:

(a) a base provided with a pair of supporting studs one of which is hollow with a sleeve at its upper end and with said studs being operable to telescopically hold a base shell in accurate coaxial alignment thereon;

(b) a reciprocally operable slide on said base having a finger for grasping a base shell at one end of the travel of said slide and depositing said shell coaxially on said sleeve at the other end of travel of said slide;

(c) a second reciprocally operable slide on said base having a pair of jaws for transporting a base shell after formation of its side pins on said sleeve to the other of said supporting studs;

(d) a pair of separable male forming dies pivotally connected to the interior of said hollow supporting stud and having laterally extending projections passing through openings in said hollow sleeve into engagement with the inner surface of a base shell when mounted on said sleeve, (e) a pair of outer female dies movable to surround said mounted base shell and having openings therein coaxially disposed relative to said male forming die projections and the openings in said hollow sleeve, and said female dies being provided with pressure-loaded pins reciprocally movable in said openings and subjected to a pressure in the direction of said base shell;

(f) means operable into engagement with said male forming dies to apply pressure thereto with attendant rotation about their pivots away from each other to cause outward lateral drawing of a portion of the wall of said shell into the openings of said female die against the counter-pressure of said pressure-loaded pins to form side pins on the outer surface of said base shell having a uniform wall thickness and sharp corners; and (g) a source of fluid pressure carried by said apparatus and controllable by an operator for applying a preselected pressure to the reciprocally movable pins in the openings of said female dies.

References Cited

UNITED STATES PATENTS

| | | | |
|---|---|---|---|
| 2,579,919 | 12/1951 | Funke | 72—399 |
| 2,586,946 | 2/1952 | Haas | 72—392 |

FOREIGN PATENTS

| | | |
|---|---|---|
| 129,464 | 5/1959 | U.S.S.R. |

CHARLES W. LANHAM, *Primary Examiner.*

K. C. DECKER, *Assistant Examiner.*